(12) United States Patent
Sakurai

(10) Patent No.: US 8,981,960 B2
(45) Date of Patent: Mar. 17, 2015

(54) WIRELESS FIELD DEVICE, DEVICE MANAGEMENT SYSTEM, AND DEVICE MANAGEMENT METHOD

(75) Inventor: Toshihiko Sakurai, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 651 days.

(21) Appl. No.: 13/335,223

(22) Filed: Dec. 22, 2011

(65) Prior Publication Data

US 2012/0161978 A1    Jun. 28, 2012

(30) Foreign Application Priority Data

Dec. 24, 2010   (JP) ................................. 2010-286883

(51) Int. Cl.
  *G08B 23/00*   (2006.01)
  *H04L 12/24*   (2006.01)
  *H04L 29/08*   (2006.01)
  *H04W 4/00*    (2009.01)

(52) U.S. Cl.
  CPC .. H04L 41/0866 (2013.01); *G05B 2219/24165* (2013.01); H04L 41/0813 (2013.01); H04L 67/125 (2013.01); H04W 4/001 (2013.01); *H04L 67/12* (2013.01)
  USPC .................. 340/870.02; 340/501; 340/539.11

(58) Field of Classification Search
  CPC .................................. G06F 21/00; G06F 21/24
  USPC ........... 340/870.02, 501, 506, 539.11, 572.1, 340/5.1, 10.1
  See application file for complete search history.

(56) References Cited

U.S. PATENT DOCUMENTS

| | | | | |
|---|---|---|---|---|
| 6,107,951 | A  * | 8/2000 | Katayama et al. | 341/176 |
| 6,657,552 | B2 * | 12/2003 | Belski et al. | 340/870.02 |
| 8,462,015 | B2 * | 6/2013 | Picard | 340/870.02 |
| 8,766,794 | B2 * | 7/2014 | Ferguson et al. | 340/539.13 |
| 8,806,607 | B2 * | 8/2014 | Archer et al. | 726/13 |
| 2007/0079370 | A1 * | 4/2007 | Jinkawa et al. | 726/19 |
| 2007/0093926 | A1 * | 4/2007 | Braun et al. | 700/112 |
| 2008/0244757 | A1 * | 10/2008 | Nakagaki | 726/28 |
| 2010/0145476 | A1 * | 6/2010 | Junk et al. | 700/7 |

FOREIGN PATENT DOCUMENTS

| | | |
|---|---|---|
| DE | 102007062915 A1 | 6/2009 |
| JP | 2006060696 A | 3/2006 |
| JP | 2006229273 A | 8/2006 |

(Continued)

OTHER PUBLICATIONS

Japanese Office Action corresponding to Japanese Patent Application No. 2010-286883, dated Nov. 20, 2012.

*Primary Examiner* — Eric M Blount
(74) *Attorney, Agent, or Firm* — Sughrue Mion, PLLC

(57) ABSTRACT

A wireless field device may include a first communication unit that performs wireless communication via a wireless network, a storage unit that stores setting information including at least one of device information specifying the wireless field device, communication setting information for implementing wireless communication via the wireless network, and device setting information prescribing an operation of the wireless field device, and a change control unit that performs control not to enable a change of the setting information when prohibition information representing prohibition of the change of the setting information is received by the first communication unit.

18 Claims, 3 Drawing Sheets

(56) References Cited

FOREIGN PATENT DOCUMENTS

| | | | |
|---|---|---|---|
| JP | 2006293001 A | 10/2006 |
| JP | 2007-183790 A | 7/2007 |
| JP | 2008062642 A | 3/2008 |
| JP | 2008-192158 A | 8/2008 |
| JP | 2009258965 A | 11/2009 |

* cited by examiner

WIRELESS FIELD DEVICE, DEVICE MANAGEMENT SYSTEM, AND DEVICE MANAGEMENT METHOD

BACKGROUND OF THE INVENTION

1. Field of the Invention

The present invention relates to a wireless field device, a device management system performing management of the wireless field device, and a device management method.

Priority is claimed on Japanese Patent Application No. 2010-286883, filed Dec. 24, 2010, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

A field device is a common designation of a sensor device such as a flowmeter or a temperature sensor, a valve device such as a flow control valve or an on-off valve, an actuator device such as a fan or a motor, or other devices installed at a plant or a factory. Most existing field devices perform transmission and reception of various signals such as measurement signals or control signals via wired field buses installed in a plant, and the like, but wireless field devices conforming to International Society of Automation (ISA) 100.11a, which is a wireless communication standard for industrial automation established by the ISA, are recently being implemented.

A communication system conforming to the wireless communication standard ISA100.11a generally includes the wireless field device, a wireless gateway, and a device management apparatus. The wireless gateway forms a wireless network with the wireless field device, thereby controlling an operation of the wireless field device participating in the wireless network and also performing collection of a variety of data obtained by the wireless field device, and the like. The device management apparatus is connected to the wireless gateway through a communication line, and performs management of the wireless field device via the wireless gateway.

In order to cause the wireless field device to participate in the wireless network, it is necessary to perform an operation of setting device information called "provisioning" on the wireless field device in a participating side, and an operation of registering device information specifying the wireless field device having performed "provisioning" in the wireless gateway in a side in which participation is made. "Provisioning" for the wireless field device is performed by a worker using, for example, a device called a provisioning device capable of infrared communication with a wireless field device, and the registration operation in the wireless gateway is performed by a manager using the device management apparatus.

A wireless field device for which the same device information as that registered in the wireless gateway is set is permitted to participate in the wireless network by the wireless gateway. A wireless field device for which device information other than that registered in the wireless gateway is set is denied participation in the wireless network by the wireless gateway. Also, in another technology field, Japanese Unexamined Patent Application, First Publication No. 2008-192158 discloses technology to improve security for re-provisioning and re-programming of a handset.

When provisioning is performed for a wireless field device participating in a wireless network through a communication path established to a wireless gateway, and setting information such as communication setting information required to perform wireless communication or the above-mentioned device information is changed, the communication path to the wireless gateway is disconnected. Likewise, if registration information registered in a wireless gateway is changed when wireless field devices participating in a wireless network are present, a communication path for a wireless field device is disconnected.

As mentioned above, a registration operation for a wireless gateway is performed by a manager using a device management apparatus connected to the wireless gateway through a communication line, and thus registration information is not often considered to be changed incorrectly. However, provisioning for a wireless field device is performed through infrared communication using a provisioning device, and the provisioning device is manipulated by an unskilled worker as well as a skilled worker. Thus, it is probable that setting information in a wireless field device is changed incorrectly by incorrect manipulation of a worker, and the like.

Furthermore, setting information set in a wireless field device may not only be changed incorrectly by incorrect manipulation of a worker, and the like, but also intentionally changed by a malicious worker. When such a change of setting information is made for a wireless field device installed in a plant, and the like, there may be a situation in which an operation of the plant, and the like should be stopped, and thus there is a problem of safety.

SUMMARY

The present invention provides a wireless field device, a device management system, and a device management method capable of improving safety by limiting a change of setting information.

A wireless field device may include: a first communication unit that performs wireless communication via a wireless network; a storage unit that stores setting information including at least one of device information specifying the wireless field device, communication setting information for implementing wireless communication via the wireless network, and device setting information prescribing an operation of the wireless field device; and a change control unit that performs control not to enable a change of the setting information when prohibition information representing prohibition of the change of the setting information is received by the first communication unit.

The wireless field device may further include: a second communication unit that performs communication with a provisioning device. If cancellation information cancelling the prohibition of the change of the setting information is received by the first communication unit, then the change control unit may perform control to change the setting information based on change information received by the second communication unit or change information received by the first communication unit.

The second communication unit may perform infrared communication with the provisioning device.

The wireless field device may further include: a display unit that displays a check representation inquiring whether or not to change the setting information a plurality of times if the setting information is changed based on the change information received by the second communication unit.

The wireless field device may further include: a display control unit that performs control of displaying a check representation inquiring whether or not to change the setting information a plurality of times if the setting information is changed based on the change information received by the second communication unit.

The wireless field device may further include: a notification unit that transmits an alarm representing improper manipulation to the wireless network via the first communication unit if the change information is received by the second communication unit while the change control unit performs control of not enabling a change of the setting information.

A device management system may include: a wireless field device that is connected to a wireless network; and a device management apparatus that manages the wireless field device by transmitting prohibition information to the wireless field device. The wireless field device may include: a first communication unit that performs wireless communication via the wireless network; a storage unit that stores setting information including at least one of device information specifying the wireless field device, communication setting information for implementing wireless communication via the wireless network, and device setting information prescribing an operation of the wireless field device; and a change control unit that performs control not to enable a change of the setting information when the prohibition information representing prohibition of the change of the setting information is received by the first communication unit.

The device management system may further include: a provisioning device that performs infrared communication with the wireless field device, the provisioning device performing setting and changing of the setting information of the wireless field device.

The device management apparatus may transmit cancellation information, which cancels prohibition of change of the setting information, to the wireless field device.

The wireless field device may further include: a second communication unit that performs communication with a provisioning device. If cancellation information cancelling the prohibition of the change of the setting information is received by the first communication unit, then the change control unit may perform control to change the setting information based on change information received by the second communication unit or change information received by the first communication unit.

The wireless field device may further include: a display unit that displays a check message inquiring whether or not to change the setting information a plurality of times if the setting information is changed based on the change information received by the second communication unit.

The wireless field device may further include: a display control unit that performs display control of displaying a check message inquiring whether or not to change the setting information on the display unit a plurality of times if the setting information is changed based on the change information received by the second communication unit.

The wireless field device may further include: a notification unit that transmits an alarm representing improper manipulation to the wireless network via the first communication unit if the change information is received by the second communication unit while the change control unit performs control of not enabling a change of the setting information.

A device management method that manages wireless field device connected to a wireless network may include: making the wireless field device, which requests to participate in the wireless network, participate in the wireless network; transmitting prohibition information, which represents prohibition of change of setting information that is set to the wireless field device, to the wireless field device via the wireless network; and performing control of the wireless field device not to change the setting information based on prohibition information, which is transmitted via the wireless network.

The setting information may include at least one of device information specifying the wireless field device, communication setting information for implementing wireless communication via the wireless network, and device setting information prescribing an operation of the wireless field device.

The device management method may further include: performing a control of changing the setting information based on change information that has been received if cancellation information cancelling prohibition of change of the setting information is received.

The device management method may further include: performing infrared communication with provisioning device.

The device management method may further include: displaying a check representation inquiring whether or not to change the setting information a plurality of times if the setting information is changed based on the change information that has been received.

The device management method may further include: transmitting an alarm representing improper manipulation to the wireless network if the change information is received while control of not enabling a change of the setting information is performed.

In the present invention, when prohibition information representing prohibition of a change of setting information is received by a wireless communication unit, a change control unit performs control of limiting a change of setting information. Accordingly, it is possible to prevent a communication path of a wireless field device participating in a wireless network from being disconnected due to the change of the setting information, and thereby safety can be improved.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE PREFERRED EMBODIMENTS

The present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

Figure 1:
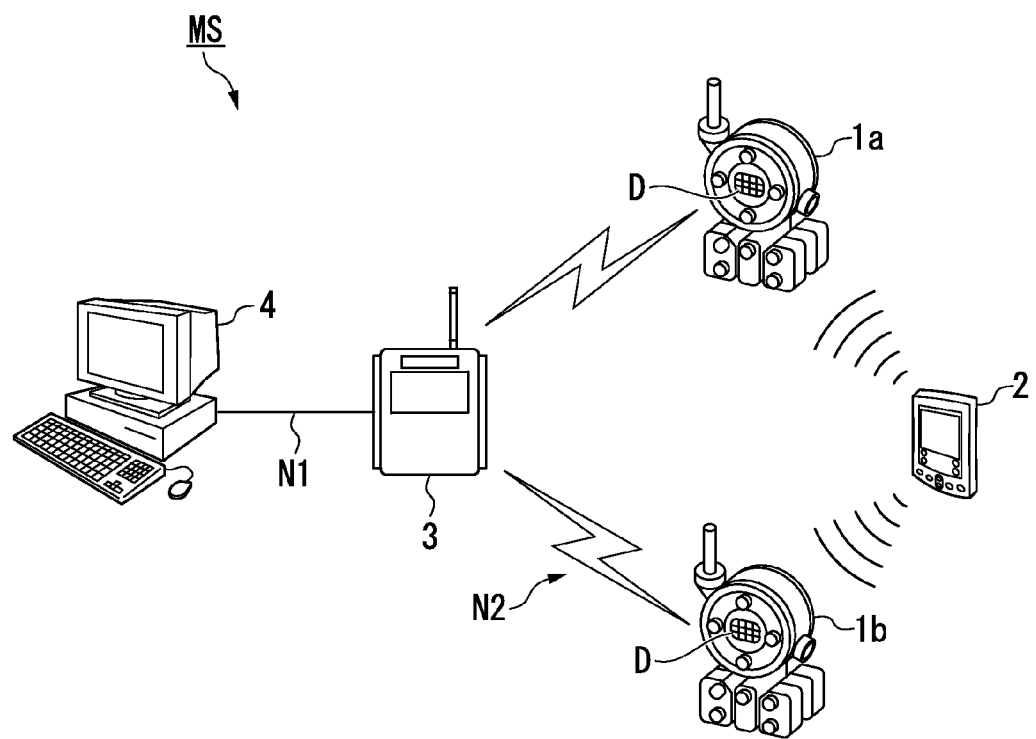
FIG. 1 is a view illustrating an overall configuration of a device management system in accordance with a first preferred embodiment of the present invention.

A wireless field device, a device management system, and a device management method in accordance with a first preferred embodiment of the present invention will be described in detail. FIG. 1 is a view illustrating an overall configuration of the device management system in accordance with the first preferred embodiment of the present invention. As shown in FIG. 1, a device management system MS of the first preferred embodiment includes wireless field devices 1$a$ and 1$b$, a provisioning device 2 (external device), a wireless gateway 3, and a device management apparatus 4. The device management apparatus 4 performs management of the wireless field devices 1a and 1b and the wireless gateway 3. The two wireless field devices 1a and 1b are shown in FIG. 1, but the number of wireless field devices is arbitrary.

The wireless field devices 1a and 1b are sensor devices such as a flowmeter and temperature sensor, a valve device such as a flow control valve or an on-off valve, an actuator device such as a fan or a motor, or other devices installed at a plant or a factory, and perform wireless communication conforming to International Society of Automation (ISA) 100.11a, which is a wireless communication standard for industrial automation. Operations of these wireless field devices 1a and 1b are controlled based on control data transmitted from the wireless gateway 3 or control data transmitted from the device management apparatus 4 through the wireless gateway 3. Also, measurement data obtained by the wireless field devices 1a and 1b is collected by the wireless gateway 3.

The wireless field devices 1a and 1b have an infrared communication function, and thus are capable of transmitting and receiving a variety of information to and from an external infrared communication device. Specifically, the wireless field devices 1a and 1b perform infrared communication with the provisioning device 2, thereby obtaining a variety of setting information (e.g., information required to participate in a wireless network N2 formed by the wireless gateway 3). In these wireless field devices 1a and 1b, display devices D, such as a liquid crystal display (LCD), displaying a variety of messages and device states to a worker who performs provisioning are installed. An internal configuration of the wireless field devices 1a and 1b will be described in detail later.

The provisioning device 2 is a terminal device capable of infrared communication with the wireless field devices 1a and 1b, and is controlled by a worker who performs installation or maintenance of the wireless field devices 1a and 1b to perform setting or change of a variety of information on the wireless field devices 1a and 1b. As setting information set in the wireless field devices 1a and 1b using the provisioning device 2, there are device information specifying the wireless field devices 1a and 1b, communication setting information for implementing wireless communication via the wireless network N2, device setting information prescribing an operation of the wireless field devices 1a and 1b, and the like.

Specifically, the device information is information representing names, type names, and the like of the wireless field devices 1a and 1b. The communication setting information is information representing an address and the like of the wireless gateway 3. The device setting information is information representing a measurement range, functions of the wireless field devices 1a and 1b, and the like. These pieces of information are input to the provisioning device 2 by manipulation of a worker, and set in the wireless field devices 1a and 1b by performing infrared communication between the provisioning device 2 and the wireless field devices 1a and 1b.

The wireless gateway 3 connects a wired network N1 that the device management apparatus 4 accesses with the wireless network N2 that the wireless field devices 1a and 1b access, thereby relaying a variety of information transmitted and received between the wireless field devices 1a and 1b and the device management apparatus 4 and also controlling the wireless field devices 1a and 1b under the management of the device management apparatus 4. The wireless gateway 3 also performs wireless communication conforming to the wireless communication standard ISA100.11a.

Specifically, under the management of the device management apparatus 4, the wireless gateway 3 performs control of the wireless field devices 1a and 1b participating in the wireless network N2 (e.g., control of on and off of a valve and the like), collection of measurement data measured by the wireless field devices 1a and 1b participating in the wireless network N2, and the like. Also, device information representing wireless field devices permitted to participate in the wireless network N2 is registered in the wireless gateway 3, and thus the wireless gateway 3 performs a participation process of permitting or not permitting a new wireless field device to participate in the wireless network N2, and the like using the device information.

The device management apparatus 4 is connected to the wired network N1 and thus manipulated by a manager of the device management system MS. The device management apparatus 4 is implemented as, for example, a desktop or note-type personal computer (PC). The device management apparatus 4 receives a variety of information from the wireless gateway 3 or transmits a variety of control information to the wireless field devices 1a and 1b through the wireless gateway 3, thereby performing management of the wireless gateway 3 and the wireless field devices 1a and 1b.

For example, the device management apparatus 4 transmits a lock signal (prohibition information) indicating prohibition of a change of setting information set in the wireless field devices 1a and 1b or a lock cancellation signal (cancellation information) indicating cancellation of the prohibition to the wireless field devices 1a and 1b, thereby managing the wireless field devices 1a and 1b. Such management is performed to prevent setting information in the wireless field devices 1a and 1b from being incorrectly changed by incorrect manipulation and the like of a worker or intentionally changed by a malicious worker, and thereby to improve safety.

Figure 2:
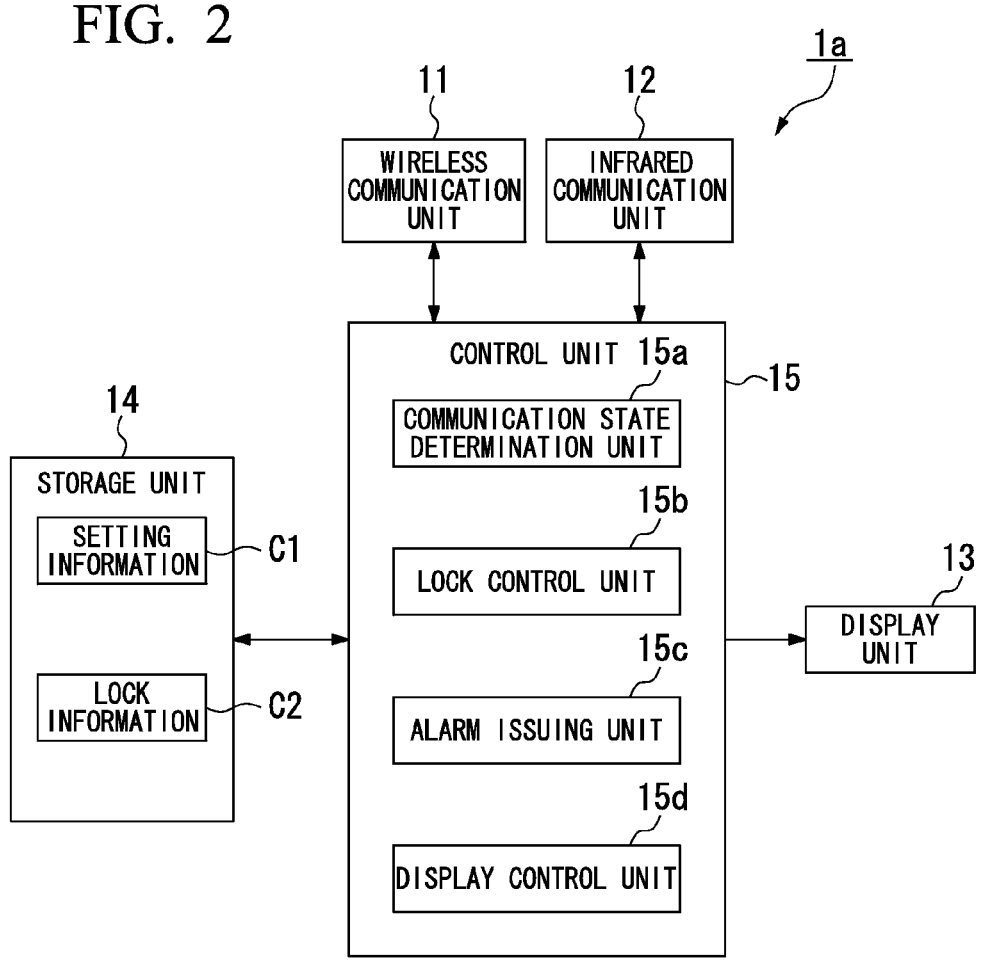
FIG. 2 is a block diagram illustrating main components of a wireless field device in accordance with the first preferred embodiment of the present invention.

Next, an internal configuration of the wireless field devices 1a and 1b will be described in detail. FIG. 2 is a block diagram illustrating main components of a wireless field device in accordance with the first preferred embodiment of the present invention. Since the wireless field devices 1a and 1b have the same configuration, only the wireless field device 1a will be described below, and description of the wireless field device 1b will be omitted. FIG. 2 shows only components required to describe the present invention among components installed in the wireless field device 1a.

As shown in FIG. 2, the wireless field device 1a includes a wireless communication unit 11 (first communication unit), an infrared communication unit 12 (second communication unit), a display unit 13, a storage unit 14, and a control unit 15. The wireless communication unit 11 performs wireless communication with the wireless gateway 3 via the wireless network N2 under the control of the control unit 15. The wireless communication performed by the wireless communication unit 11 conforms to the wireless communication standard ISA100.11a. The infrared communication unit 12 performs infrared communication with the provisioning device 2, thereby obtaining a variety of setting information. The display unit 13 has the display device D shown in FIG. 1, and displays a variety of messages for a worker who performs provisioning, device states, and the like on the display device D under the control of the control unit 15.

The storage unit 14 includes, for example, a non-volatile semiconductor memory, and stores setting information C1 and lock information C2. The setting information C1 is the above-mentioned device information, communication setting information, device setting information, and the like. The lock information C2 denotes prohibition of a change of the setting information C1. When a lock signal is transmitted from the device management apparatus 4, the lock information C2 is stored in the storage unit 14 by the control unit 15.

When a lock cancellation signal is transmitted from the device management apparatus 4, the lock information C2 is removed from the storage unit 14 by the control unit 15.

The control unit 15 includes a communication state determination unit 15*a*, a lock control unit 15*b*, an alarm issuing unit 15*c* (notification unit), and a display control unit 15*d*. The control unit 15 controls an overall operation of the wireless field device 1*a*. The communication state determination unit 15*a* determines whether or not wireless communication can be performed by the wireless communication unit 11 via the wireless network N2. Specifically, the communication state determination unit 15*a* determines whether or not a communication session with the wireless gateway 3 has been established.

The lock control unit 15*b* performs control of limiting a change of the setting information C1 stored in the storage unit 14 (lock control). Specifically, if the communication state determination unit 15*a* determines that wireless communication via the wireless network N2 is possible, and a lock signal from the device management apparatus 4 is received by the wireless communication unit 11 so that the lock information C2 is stored in the storage unit 14 by the control unit 15, the lock control unit 15*b* performs control of limiting a change of the setting information C1.

While such lock control is performed, the setting information C1 is not changed even if control data (change information) instructing a change of the setting information C1 stored in the storage unit 14 is received by any of the wireless communication unit 11 and the infrared communication unit 12. Such control is performed to prevent the setting information C1 stored in the wireless field device 1*a* that is in a communication state from being incorrectly changed by incorrect manipulation and the like of a worker or intentionally changed by a malicious worker, and thereby to improve safety.

Also, when the lock cancellation signal from the device management apparatus 4 is received by the wireless communication unit 11, and the lock information C2 is removed from the storage unit 14 by the control unit 15, the lock control unit 15*b* performs control of changing the setting information C1 stored in the storage unit 14 based on control data (control data instructing a change of the setting information C1 stored in the storage unit 14: change information) received by the wireless communication unit 11 or the infrared communication unit 12. In other words, when the lock cancellation signal is transmitted from the device management apparatus 4 managing the wireless field device 1*a*, lock control is cancelled to perform control of enabling a change of the setting information C1.

When the control data is received by the infrared communication unit 12 while lock control is performed by the lock control unit 15*b*, the alarm issuing unit 15*c* transmits an alarm signal indicating that improper manipulation has been attempted to the device management apparatus 4 through the wireless communication unit 11. As mentioned above, the setting information C1 stored in the storage unit 14 may not only be changed by incorrect manipulation of a worker but also intentionally changed by a malicious worker. For this reason, a change instruction given to the wireless field device 1*a* performing lock control is considered improper manipulation, and the device management apparatus 4 is immediately notified of the improper manipulation, so that safety can be improved.

The display control unit 15*d* performs display control for the display unit 13. Specifically, when the setting information C1 stored in the storage unit 14 is changed based on control data received by the wireless communication unit 11 or the infrared communication unit 12 while lock control has been cancelled by the wireless field device 1*a*, the display control unit performs display control of displaying a check message inquiring whether or not to change the setting information C1 on the display unit 13 a plurality of times. Such display control is performed to cause a worker to pay attention and prevent the setting information C1 from being incorrectly changed by incorrect manipulation and the like of the worker. Also, in order to cause a worker to pay attention, it is preferable to change a displayed check message every display time rather than to display the same check message a plurality of times.

The above-described functions of the control unit 15 (the communication state determination unit 15*a* to the display control unit 15*d*) can be implemented by hardware, but may be implemented by software as well. In other words, it is preferable for a computer to execute a program for implementing the functions of the communication state determination unit 15*a* to the display control unit 15*d*. For example, a program for implementing the functions of the communication state determination unit 15*a* to the display control unit 15*d* is recorded in a recording medium, and the program recorded in the recording medium is installed on a computer using a drive device capable of reading the data recorded in the recording medium, so that the functions of the communication state determination unit 15*a* to the display control unit 15*d* can be performed by software.

Alternatively, a computer may access a network such as the Internet, so that a program as recorded in the recording medium can be downloaded from the network to the computer. The program downloaded to the computer can be installed on the computer, like a program read from a computer-readable recording medium using a drive device.

Figure 3:
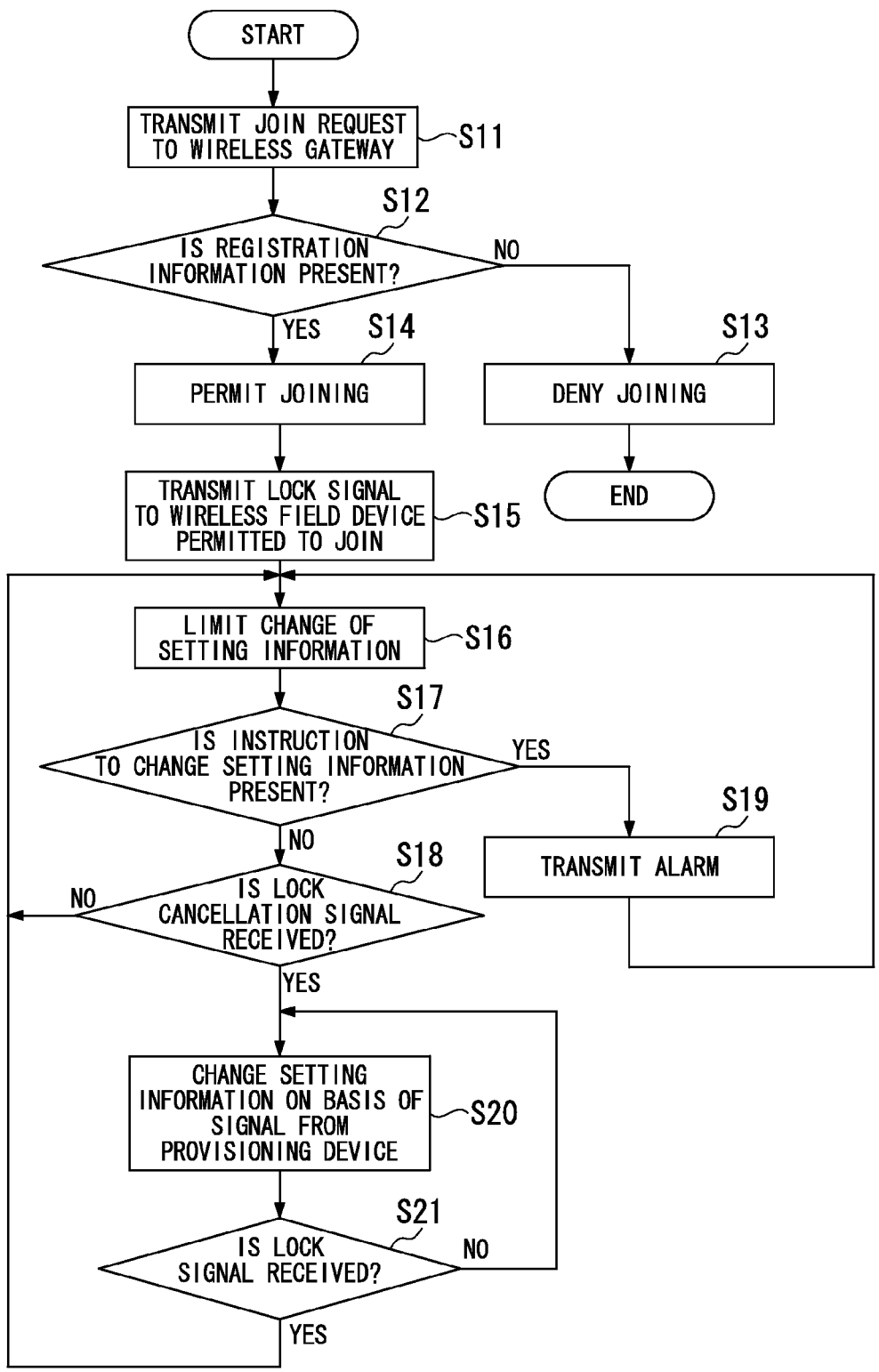
FIG. 3 is a flowchart illustrating a device management method in accordance with the first preferred embodiment of the present invention.

Next, an operation performed by a device management system having the above configuration will be described. To simplify description, the operation performed to cause the wireless field device 1*a* to newly participate in the wireless network N2 of the device management system MS shown in FIG. 1 when the wireless field device 1*b* has already participated in the wireless network N2 will be described below by way of example. FIG. 3 is a flowchart illustrating a device management method in accordance with the first preferred embodiment of the present invention.

In order to cause the wireless field device 1*a* to newly participate in the wireless network N2 of the device management system MS, a worker first inputs information to be set in the wireless field device 1*a* to the provisioning device 2. Specifically, information representing an identification (ID) (identifier) of the wireless network N2, a join key, address information on the wireless gateway 3, a name and type name of the wireless field device 1*a*, and the like is input.

When the input operation is finished, and the worker manipulates the provisioning device 2 to perform infrared communication with the wireless field device 1*a*, the information input to the provisioning device 2 is transmitted to the wireless field device 1*a*. The information transmitted from the provisioning device 2 is received by the infrared communication unit 12 of the wireless field device 1*a* and stored as the setting information C1 in the storage unit 14 by the control unit 15.

Together with the operation, a manager of the device management system MS manipulates the device management apparatus 4 to perform an operation of registering device information on the wireless field device 1*a* (the wireless field device 1*a* to be caused to participate in the wireless network N2) for which provisioning is performed in the wireless gateway 3. This operation may be performed before provisioning for the wireless field device 1a is performed, or performed at the same time as provisioning.

When provisioning for the wireless field device 1a is finished, an operation of installing the wireless field device 1a in a field is performed by a worker, and power of the wireless field device 1a is supplied after the installation operation is finished. When the power of the wireless field device 1a is supplied, wireless communication between the wireless field device 1a and the wireless gateway 3 is started, and a join request is transmitted from the wireless field device 1a to the wireless gateway 3 (the wireless gateway 3 whose address information is set by provisioning) (step S11).

The join request transmitted from the wireless field device 1a is received by the wireless gateway 3, and the wireless gateway 3 determines whether or not device information on the wireless field device 1a having made the join request has been registered (step S12). When it is determined that device information on the wireless field device 1a has not been registered (when the determination result is "NO"), a signal indicating denial to join the wireless field device 1a is transmitted from the wireless gateway 3, and thereby participation of the wireless field device 1a in the wireless network N2 is denied (step S13).

On the other hand, when it is determined that device information on the wireless field device 1a has been registered (when the determination result is "YES"), a signal indicating permission to join the wireless field device 1a is transmitted from the wireless gateway 3, and thereby participation of the wireless field device 1a in the wireless network N2 is permitted (step S14). When the wireless field device 1a is permitted to join, a communication session is established between the wireless field device 1a and the wireless gateway 3, and the wireless field device 1a becomes capable of wireless communication via the wireless network N2. Then, the communication state determination unit 15a included in the control unit 15 of the wireless field device 1a determines that wireless communication via the wireless network N2 is possible.

Also, when the wireless field device 1a is permitted to join, a signal indicating that the new wireless field device 1a has participated in the wireless network N2 is transmitted from the wireless gateway 3 to the device management apparatus 4. When this signal is received by the device management apparatus 4, a lock signal indicating prohibition of a change of the setting information C1 stored in the storage unit 14 of the wireless field device 1a is transmitted from the device management apparatus 4 to the wireless field device 1a permitted to join (step S15).

When the lock signal transmitted from the device management apparatus 4 is received by the wireless communication unit 11 of the wireless field device 1a, the lock information C2 is stored in the storage unit 14 by the control unit 15. Then, since it is determined by the communication state determination unit 15a that wireless communication is possible, lock control of controlling a change of the setting information C1 stored in the storage unit 14 is performed by the lock control unit 15b included in the control unit 15 (step S16).

When lock control by the lock control unit 15b is started, the alarm issuing unit 15c included in the control unit 15 determines whether or not control data instructing a change of the setting information C1 stored in the storage unit 14 is received by the infrared communication unit 12 (step S17). When the control data is not received by the infrared communication unit 12, the determination result of the alarm issuing unit 15c becomes "NO," and the lock control unit 15b determines whether or not a lock cancellation signal from the device management apparatus 4 is received by the wireless communication unit 11 (step S18). When a lock cancellation signal is not received, the determination result of the lock control unit 15b becomes "NO," and the process proceeds to step S16 so that lock control continues.

Meanwhile, when it is determined that the control data instructing the change of the setting information C1 is received by the infrared communication unit 12 (when the determination result of step S17 is "YES"), the alarm issuing unit 15c transmits an alarm signal indicating that improper manipulation has been attempted to the device management apparatus 4 (step S19). Here, for example, the manager who has seen the alarm signal transmitted to the device management apparatus 4 instructs a worker in the field to rapidly check the wireless field device 1a to which improper manipulation has been attempted, and the like. After the alarm signal is transmitted, lock control continues in the wireless field device 1a (step S16).

Also, when the lock cancellation signal from the device management apparatus 4 is received by the wireless communication unit 11 while lock control is performed by the lock control unit 15b, the determination result of step S18 becomes "YES," and the lock information C stored in the storage unit 14 is removed by the control unit 15. Then, the lock control unit 15b cancels lock control and performs control of changing the setting information C1 stored in the storage unit 14 based on the control data received by the wireless communication unit 11 or the infrared communication unit 12 (the control data instructing the change of the setting information C1 stored in the storage unit 14) (step S20).

Here, the control data received by the wireless communication unit 11 or the infrared communication unit 12 of the wireless field device 1a is not always proper. For example, when incorrect manipulation is performed on the provisioning device 2 by a worker, incorrect control data may be received by the infrared communication unit 12. When the setting information C1 is changed based on such incorrect control data, the wireless field device 1a may perform an unintended operation. For this reason, when a change of the setting information C1 stored in the storage unit 14 is performed by the lock control unit 15b, the display control unit 15d performs control of displaying a check message inquiring of a worker whether or not to perform the change of the setting information C1 on the display unit 13.

In the first preferred embodiment, the display control unit 15d performs control of displaying different check messages a plurality of times on the display unit 13. For example, as shown in first to third messages below, three different check messages are displayed on the display unit 13.

First message: "Currently in communication. Do you want to change setting?"

Second message: "If setting is changed, communication is likely to be interrupted. Is this okay?"

Third message: "Do you really want to change the setting?"

Such check messages are displayed on the display unit 13 a plurality of times, and thereby it is possible to cause a worker to pay attention and reduce incorrect manipulation of the worker.

Alternatively, the display control unit 15d performs control of displaying a check message once with the content varied every display time. For example, check messages shown in display examples 1 and 2 below are randomly displayed on the display unit 13.

Display Example 1

"Currently in communication!
If setting is changed, communication is likely to be interrupted. Do you want to change setting?"

Display Example 2

"Currently in communication!
Since communication is likely to be interrupted by a change of setting, it is not performed. If you select NO, it will be performed."

According to which one of display example 1 and display example 2 is displayed on the display unit 13, a response of a worker is switched between "YES" and "NO." Thus, it is possible to cause the worker to pay attention and reduce an incorrect operation of the worker.

Subsequently, the lock control unit 15b determines whether or not the lock signal from the device management apparatus 4 is received by the wireless communication unit 11 (step S21). Here, the worker contacts the manager of the device management system MS (e.g., by phone) to inform the manager that the operation of changing the setting information C1 set in the wireless field device 1a has been finished, and thereby the lock signal is transmitted from the device management apparatus 4. When the lock signal is not received, the determination result of the lock control unit 15b becomes "NO," and the process proceeds to step S16 so that a change of the setting information C1 continues.

On the other hand, when the lock signal from the device management apparatus 4 is received by the wireless communication unit 11 of the wireless field device 1a, the lock information C2 is stored in the storage unit 14 by the control unit 15. Then, the determination result of step S21 becomes "YES," and the lock control unit 15b performs lock control with reference to the determination result of the communication state determination unit 15a (step S16). When the communication state determination unit 15a has determined that communication is not possible, lock control is not performed by the lock control unit 15b.

As described above, in the first preferred embodiment, when the communication state determination unit 15a determines that the wireless field device 1a is capable of wireless communication via the wireless network N2, and lock information is received from the device management apparatus 4, the lock control unit 15b performs lock control of limiting a change of the setting information C1 stored in the storage unit 14. Performance of such lock control can prevent the setting information C1 from being incorrectly changed by incorrect manipulation of a worker or intentionally changed by a malicious worker, so that safety can be improved.

Also, in the first preferred embodiment, when control data instructing a change of the setting information C1 stored in the storage unit 14 is received by the wireless communication unit 11 or the infrared communication unit 12 while the lock control is performed, an alarm signal indicating that improper manipulation has been attempted is transmitted to the device management apparatus 4 through the wireless communication unit 11. Hereby, it becomes possible to rapidly check a wireless field device to which improper manipulation has been attempted, and the like, and thereby safety can be improved. Also, when a change of the setting information C1 is performed while the lock control has been cancelled, display of a plurality of successive different check messages and the like are performed, and thus it is possible to cause a worker to pay attention and reduce incorrect manipulation of the worker.

Thus far, the wireless field device, the device management system, and the device management method in accordance with a preferred embodiment of the present invention have been described. However, the present invention is not limited to the above-described preferred embodiment and can be freely modified within the scope of the present invention. For example, in the preferred embodiment above, an example in which device information, communication setting information, and device setting information is included in the setting information C1, and a change of the device information, the communication setting information and the device setting information is limited all together by performing lock control on the setting information C1 has been described. However, lock control may be separately performed on the device information, the communication setting information and the device setting information. Furthermore, the setting information C1 may be grouped according to type, characteristic, and the like of information, and a change of content may be limited according to group.

Also, in the preferred embodiment above, an example in which the lock information C2 is stored in the storage unit 14 of the wireless field devices 1a and 1b has been described. However, the device management apparatus 4 may manage the lock information C2 in the wireless field devices 1a and 1b all together. When the lock signal C2 is managed all together by the device management apparatus 4, the wireless field devices 1a and 1b inquire of the device management apparatus 4 whether or not lock information is present, and perform lock control according to the result of inquiry.

Moreover, in the preferred embodiment above, an example in which the lock information C2 is set for the respective wireless field devices 1a and 1b has been described. However, common system lock information may be set for the overall device management system MS, and lock control for both of the wireless field devices 1a and 1b may be enabled based on the system lock information only. Using such system lock information, it is possible to instantly realize a situation in which lock control is performed by both of the wireless field devices 1a and 1b.

Further, in the preferred embodiment above, the wireless field devices 1a and 1b that obtain a variety of setting information by performing infrared communication with the provisioning device 2 have been described by way of example. However, the present invention can also be applied to a wireless field device that obtains a variety of setting information by performing wireless communication with an external device, such as a provisioning device, according to wireless communication standards, such as Bluetooth and Institute of Electrical and Electronics Engineers (IEEE) 802.11a/b/g, or a wireless field device that obtains a variety of setting information by performing wired communication with the external device according to wired communication standards, such as RS-232C.

The term "configured" is used to describe a component, unit or part of a device includes hardware and/or software that is constructed and/or programmed to carry out the desired function.

Moreover, terms that are expressed as "means-plus function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A wireless field device comprising:
    a first communication unit that performs wireless communication, via a wireless network;
    a second communication unit that performs communication with a provisioning device;
    a storage unit that stores setting information including at least one of device information specifying the wireless field device, communication setting information for implementing wireless communication via the wireless network, and device setting information prescribing an operation of the wireless field device; and
    a change control unit that performs control not to enable a change of the setting information when the first communication unit or the second communication unit receives change information of the setting, information after the first communication unit receives prohibition information representing prohibition of the change of the setting information, and that performs control to change the setting information based on the change information received by the first communication unit or the second communication unit when the first communication unit or the second communication unit receives the change information after the first communication unit receives cancellation information cancelling the prohibition of the change of the setting information.

2. The wireless field device according to claim 1, wherein the second communication unit performs infrared communication with the provisioning device.

3. The wireless field device according to claim 1, further comprising:
    a display unit that displays a check representation inquiring whether or not to change the setting information a plurality of times if the setting information is changed based on the change information received by the second communication unit.

4. The wireless field device according to claim 1, further comprising:
    a display control unit that performs control of displaying a check representation inquiring whether or not to change the setting information a plurality of times if the setting information is changed based on the change information received by the second communication unit.

5. The wireless field device according to claim 1, further comprising:
    a notification unit that transmits an alarm representing improper manipulation to the wireless network via the first communication unit if the change information is received by the second communication unit while the change control unit performs control of not enabling a change of the setting information.

6. A device management system comprising:
    a wireless field device that is connected to a wireless network; and
    a device management apparatus that manages the wireless field device by transmitting prohibition information and cancellation information to the wireless field device, the prohibition information representing prohibition of the change of the setting information, the cancellation information cancelling the prohibition of the change of the setting information and wherein
    the wireless field device comprising:
        a first communication unit that performs wireless communication via the wireless network;
        a second communication unit that performs communication with a provisioning device;
        a storage unit that stores the setting information including at least one of device information specifying the wireless field device, communication setting information for implementing wireless communication via the wireless network, and device setting information prescribing an operation of the wireless field device; and
        a change control unit that performs control not to enable a change of the setting information when the first communication unit or the second communication unit receives change information of the setting information after the first communication unit receives the prohibition information, and that performs control to change the setting information based on the change information received by the first communication unite or the second communication unit when the first communication unit or the second communication unite receives the change information after the first communication unit receives the cancellation information.

7. The device management system according to claim 6, further comprising:
    the provisioning device that performs infrared communication with the wireless field device, the provisioning device performing setting and changing of the setting information of the wireless field device.

8. The device management system according to claim 6, wherein the wireless field device further comprises:
    a display unit that displays a check message inquiring whether or not to change the setting information a plurality of times if the setting information is changed based on the change information received by the second communication unit.

9. The device management system according to claim 6, wherein the wireless field device further comprises:
    a display control unit that performs display control of displaying a check message inquiring whether or not to change the setting information on the display unit a plurality of times if the setting information is changed based on the change information received by the second communication unit.

10. The device management system according to claim 6, wherein the wireless field device further comprises:
    a notification unit that transmits an alarm representing improper manipulation to the wireless network via the first communication unit if the change information is received by the second communication unit while the change control unit performs control of not enabling a change of the setting information.

11. A device management method that manages wireless field device connected to a wireless network, the device management method comprising:
    making the wireless field device, which requests to participate in the wireless network, participate in the wireless network;
    transmitting prohibition information, which represents prohibition of change of setting information that is set to the wireless field device, to the wireless field device via the wireless network; and performing control of the wireless field device not to change the setting information based on prohibition information, which is transmitted via the wireless network.

12. The device management method according to claim 11, wherein the setting information includes at least one of device information specifying the wireless field device, communication setting information for implementing wireless communication via the wireless network, and device setting information prescribing an operation of the wireless field device.

13. The device management method according to claim 11, further comprising:

performing a control of changing the setting information based on change information that has been received if cancellation information cancelling prohibition of change of the setting information is received.

14. The device management method according to claim 11, further comprising:

performing infrared communication with provisioning device.

15. The device management method according to claim 11, further comprising:

displaying a check representation inquiring whether or not to change the setting information a plurality of times if the setting information is changed based on the change information that has been received.

16. The device management method according to claim 11, further comprising:

transmitting an alarm representing improper manipulation to the wireless network if the change information is received while control of not enabling a change of the setting information is performed.

17. The wireless field device according to claim 1, wherein the change control unit that stores lock information representing prohibition of the change of the setting information in the storage unit when the change control unit receives the prohibition information, and wherein the change control unit that removes the lock information from the storage unit when the change control unit receives the cancellation information.

18. The device management system according to claim 6, wherein the change control unit that stores lock information representing prohibition of the change of the setting information in the storage unit when the change control unit receives the prohibition information, and wherein the change control unit that removes the lock information from the storage unit when the change control unit receives the cancellation information.

\* \* \* \* \*